June 17, 1924.

E. H. PETERSEN 1,498,117

SAFETY CLUTCH CONTROL FOR TRACTORS

Filed July 7, 1922

Inventors
Elmer H. Petersen

By William J. Jacobi
Attorney

Patented June 17, 1924.

1,498,117

UNITED STATES PATENT OFFICE.

ELMER H. PETERSEN, OF BELDEN, NEBRASKA.

SAFETY CLUTCH CONTROL FOR TRACTORS.

Application filed July 7, 1922. Serial No. 573,476.

*To all whom it may concern:*

Be it known that I, ELMER H. PETERSEN, a citizen of the United States, residing at Belden, in the county of Cedar and State of Nebraska, have invented certain new and useful Improvements in Safety Clutch Controls for Tractors, of which the following is a specification.

This invention relates to a safety clutch control for tractors, particularly adapted for use in connection with a well known tractor.

The primary object of my invention is to provide an attachment for the Fordson tractor, which is mounted on the axle housing and has means for connecting same with the clutch pedal and to the draw bar of the tractor to prevent the tractor from raising upwardly and turning over backwardly due to a heavy pull, attached to the draw bar.

A further object of my invention is to provide a device of the above stated character, which is automatic in operation and which will move the clutch to a neutral position upon the least upward movement of the front of the tractor.

A still further object of my invention is to provide an attachment for Fordson tractors of the above stated character which is simple in construction, efficient for the purpose intended and one that can be manufactured and installed on a tractor at a relatively low cost.

These and like objects of my invention will be better understood as the description proceeds and as is specifically pointed out in the appended claims.

Figure 1:
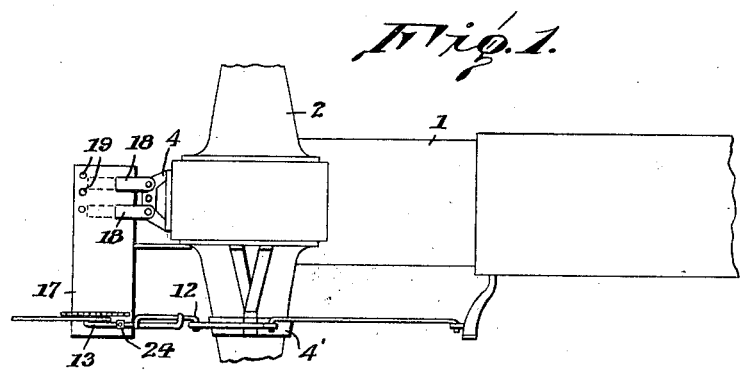

Referring to the accompanying drawing which forms a part of this specification and which clearly illustrates the construction of my invention, Figure 1 is a plan view of a Fordson tractor, with parts broken away showing my attachment applied thereto.

Figure 2:
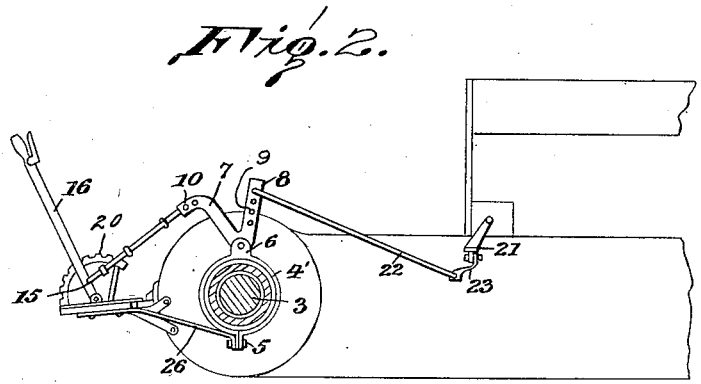
Figure 3:
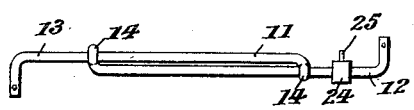

Figure 2 is a side elevation of same, and Figure 3 is an enlarged detail plan view of the adjusting mechanism.

Referring to the accompanying drawing in detail, like characters of reference will be used to designate like parts in the different views.

It is a well known fact to farmers and others familiar with the use of a Fordson tractor, that when the load becomes greater than the engine can pull, that the tractor has a tendency to rise upwardly and turn over backwardly, which not only results in loss of life and injury to the operator of the tractor, but also results in considerable damage to the tractor and the load being hauled, and my invention has been designed to eliminate any possibility of the tractor turning over backwardly.

The numeral 1 indicates a tractor as a whole, and 2 the housing mounted on the rear axle 3. The numeral 4 designates a hitch which is connected to the rear end of the housing 2, all of which are of the usual construction and for which no claim is herein made.

My invention comprises a band 4' which is positioned around the housing and rear axle and fastened together by means of a bolt 5 on the underside of same. The band 4' is provided on its upper side with lips 6 in which is pivotally connected a V-shaped lever 7. One arm of the V-shaped lever as indicated by the numeral 8 is preferably straight and provided therein with a series of apertures 9 the purpose of which will be better understood as the description follows. The other arm of the lever 7 has its end bent laterally and engaged with an adjustable coupling rod 11. This will change the effect of the entire description of these elements. The adjustable coupling rod 11 comprises members 12 and 13, one end of each member is formed with an eye 14 that engages the corresponding member of the adjustable rod to hold same in position and permit longitudinal movement of the two members 12 and 13. The free end of the member 13 is connected as indicated by the numeral 15 to a lever 16 that is mounted on a platform 17 positioned on the rear of the tractor. The platform 17 is provided with clamps 18 that are secured in any suitable manner to the hitch 3 carried by the housing 2. The platform 17 is loosely supported by the brackets 18 to provide a hinged movement for said platform. The platform 17 is provided adjacent the end with a series of openings 19 to provide means by which a load may be connected thereto, and mounted on the opposite end thereof is quadrant 20 on which the lever 16 operates.

The straight arm 8 of the V-shaped lever 7 is connected with a clutch pedal 21 by means of a rod 22 and a bracket 23.

Positioned on the member 12 and the adjustable rod 11 is a stop 24, which is provided with a set screw 25. The block 24 is positioned on the member 12 between its connection as at 10 with the lever 7 and the eye 14 of the member 13, and is adjusted at any point by means of the set screw 25.

In addition to the brackets 18 for supporting the platform 17, braces 26 are also used which connect one end to the platform and the other end to the band 4' that encircles the housing 2.

For the purpose of explaining the operation of my invention, I will assume that the tractor is pulling a load and that the same becomes greater than the tractor can haul, the unusual load would have a tendency to cause the tractor to rise slightly upwardly at the forward end, and as the tractor continues to rise, the platform 17 will remain in a parallel or horizontal position, which will cause the block 14 to engage the eye and as the lever 7 cannot move any further backwardly, the clutch pedal 21 is moved to a neutral position through the rod 22. The rod 22 can be adjusted by means of the openings mounted in the arm 8, so that the least upward movement on the front of the tractor will cause the attachment to operate.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new for my invention and desire to secure by Letters Patent is:—

1. In a safety clutch control for tractors, comprising a band adapted to be secured around the axle housing, a V-shaped lever pivotally connected to said band, means for connecting one arm of the V-shaped lever with a clutch pedal, a hitch attaching platform connected to the rear of the housing, means for connecting said platform with one arm of the V-shaped lever and adjusting means carried by the means for connecting the platform with one arm of the V-shaped lever to automatically move the clutch pedal into a neutral position upon upward movement of the tractor.

2. In a safety clutch control for tractors, comprising a band adapted to be secured around the axle housing, a V-shaped lever pivotally supported by said band, one arm of said V-shaped lever connected with a clutch pedal, an adjustable connecting rod adapted to connect one arm of the lever with the platform hitching load and means carried by the adjustable connecting rod for automatically moving the clutch pedal into a neutral position upon upward movement of the tractor.

In testimony whereof I affix my signature.

ELMER H. PETERSEN.